United States Patent
Kanemura et al.

(10) Patent No.: US 9,459,703 B2
(45) Date of Patent: Oct. 4, 2016

(54) CHARACTER INPUT DEVICE AND CHARACTER INPUT METHOD

(75) Inventors: Kouichi Kanemura, Osaka (JP); Yasushi Kojima, Osaka (JP); Teruo Koukai, Nara (JP); Toshiyuki Tanaka, Osaka (JP); Hiroyoshi Ohmiya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 342 days.

(21) Appl. No.: 13/146,499

(22) PCT Filed: Dec. 14, 2009

(86) PCT No.: PCT/JP2009/006835
§ 371 (c)(1),
(2), (4) Date: Jul. 27, 2011

(87) PCT Pub. No.: WO2010/086945
PCT Pub. Date: Aug. 5, 2010

(65) Prior Publication Data
US 2011/0279460 A1    Nov. 17, 2011

(30) Foreign Application Priority Data
Jan. 28, 2009 (JP) ................. 2009-016185

(51) Int. Cl.
*G06F 3/023* (2006.01)
*G06F 3/0489* (2013.01)
(Continued)

(52) U.S. Cl.
CPC ......... *G06F 3/0233* (2013.01); *G06F 3/0236* (2013.01); *G06F 3/04895* (2013.01); *H04N 5/4403* (2013.01); *H04N 21/42213* (2013.01); *H04M 2250/70* (2013.01)

(58) Field of Classification Search
CPC ............... H04N 2005/4419; G06F 3/0481; G06F 17/3064; G09G 5/00; G09G 5/08
See application file for complete search history.

(56) References Cited

U.S. PATENT DOCUMENTS

| 5,302,990 A | * | 4/1994 | Satoh et al. | 396/292 |
| 2003/0016873 A1 | * | 1/2003 | Nagel et al. | 382/228 |

(Continued)

FOREIGN PATENT DOCUMENTS

| JP | 7-244567 A | 9/1995 | |
| JP | 07244567 A | * 9/1995 | ............... G06F 3/14 |

(Continued)

OTHER PUBLICATIONS

International Search Report for PCT/JP2009/006835, Apr. 20, 2010.

*Primary Examiner* — Maurice L McDowell, Jr.
*Assistant Examiner* — Raffi Isanians
(74) *Attorney, Agent, or Firm* — McDermott Will & Emery LLP

(57) ABSTRACT

A character input device includes: a terminal control unit that accepts information on a character candidate being a candidate of an input confirmed character, and performs a displaying process of the character candidate, and generates a guide image whose image varies in accordance with a remaining time until an input confirmation of the character candidate; and a display unit that displays the character candidate and the guide image. By displaying the guide image that varies in accordance with the remaining time before the input character is confirmed, how long it takes until the character is confirmed, or whether the character has already been confirmed is reported to the user, so as to avoid an unintended manipulation of the user.

12 Claims, 10 Drawing Sheets

(51) Int. Cl.
*H04N 5/44* (2011.01)
*H04N 21/422* (2011.01)

(56) References Cited

U.S. PATENT DOCUMENTS

| | | | | |
|---|---|---|---|---|
| 2004/0021691 | A1* | 2/2004 | Dostie et al. | 345/773 |
| 2006/0160591 | A1* | 7/2006 | Kogo | 463/1 |
| 2006/0227105 | A1* | 10/2006 | Kogo | 345/156 |
| 2007/0005483 | A1* | 1/2007 | Graham | 705/37 |
| 2007/0294239 | A1* | 12/2007 | Vuong | 707/5 |
| 2007/0294618 | A1* | 12/2007 | Yamamoto | G06F 3/0489 715/210 |
| 2008/0117171 | A1* | 5/2008 | Kwak | 345/168 |
| 2009/0043565 | A1* | 2/2009 | Fux et al. | 704/9 |
| 2009/0058809 | A1* | 3/2009 | Vuong et al. | 345/168 |

FOREIGN PATENT DOCUMENTS

| | | |
|---|---|---|
| JP | 2002-116870 A | 4/2002 |
| JP | 2003-76474 A | 3/2003 |
| JP | 2008-234474 A | 10/2008 |

* cited by examiner

CHARACTER INPUT DEVICE AND CHARACTER INPUT METHOD

This application is a U.S. National Phase Application of PCT International Application PCT/JP2009/006835.

TECHNICAL FIELD

The present invention relates to a character input device and a character input method, and to a technique to save labor of inputting characters for the user.

BACKGROUND ART

As a method of inputting or selecting a character by a manipulation of pressing a key such as a character key and a numeric key with a remote controller of audio-visual equipment such as a television set or with a mobile phone, the following techniques are known.

What is widely known is a method in which a plurality of characters is assigned to each numeric key, and the character to be the input candidate is changed in accordance with the number of times that the key is pressed. In this method, 50 syllabary kana or katakana characters, 26 alphabetical characters and the like can be input with small number of keys. According to such a method of inputting many characters with small number of keys, what is generally employed is a manipulation method in which a precedently input character is confirmed based on a key manipulation of inputting the next different character, or a manipulation of shifting the cursor using a four-way key. What is meant by confirming an input character is to determine to use a character candidate having been input for a character string such as text being prepared, and to prepare for an input work of the next character.

Another known input character confirming method is an input character confirming method that has a function of automatically confirming a character being input via a numeric key after a lapse of a predetermined waiting time. When the character is confirmed, such a confirmation is announced by a beeper or the like, and then the next character input is accepted. According to this method, key manipulation for a confirmation is unnecessary (e.g., see Patent Document 1).

There is also known a method in which, when one of the numeric keys is manipulated, a plurality of kana characters or a plurality of alphabetical characters previously assigned to the numeric key is successively displayed on a display unit as time passes and when any numeric key or a key for a confirmation is manipulated, the character being displayed on the display unit is confirmed as the input character. What is required is just to wait appearance of the desired character, and to manipulate the key for a confirmation. Therefore, it becomes possible to reduce the number of times of manipulating the key for searching for the assigned one of the characters (e.g., see Patent Document 2).

Further, there is a method in which, in a case where a plurality of characters is assigned to each numeric key, the displaying color of the numeric key is successively varied at predetermined timing, and the character is selected based on a manipulation timing of the numeric key (e.g., see Patent Document 3).

However, each method described in Patent Documents 1, 2, and 3 is unclear as to the timing at which the character is confirmed, and may invite an unintended selection. That is, user unaccustomed to the automatic confirmation cannot predict how long it takes before a confirmation is made, and may select wrong one, e.g., the user may press the key immediately after an automatic confirmation. For example, in a case where "a", "i" and "u" are assigned to an identical key and in a state where "i" is being displayed, when the user, who is not aware of "i" having already been automatically confirmed, further presses the key for changing "i" to "u", what is entered is "a" because "i" has already been confirmed. This makes the user confused.

PRIOR ART DOCUMENT

Patent Documents

Patent Document 1] Unexamined Japanese Patent Publication No. 2003-76474 (page 1, FIG. 1 and others)
[Patent Document 2] Unexamined Japanese Patent Publication No. 2002-116870 (page 1, FIG. 1 and others)
[Patent Document 3] Unexamined Japanese Patent Publication No. 2008-234474 (page 1, FIG. 1 and others)

DISCLOSURE OF THE INVENTION

A character input device and a character input method according to the present invention employ the following structure and process procedure.

(1) Provide a terminal control unit that accepts information on a character candidate to be a candidate of an input confirmed character, and performs a displaying process of the character candidate, and generates a guide image whose displaying mode varies in accordance with a remaining time until an input confirmation of the character candidate, and a display unit that displays the character candidate and the guide image. Further, instead of the guide image, a guide sound that varies in accordance with the remaining time until an input confirmation may be employed.

(2) The guide image is at least one of an image of a number or a character, an image of a manipulated key, a cursor image of an input character string area, and other displayed image. The guide image varies in at least one of a color, a brightness, a shape, and a size in accordance with the remaining time until an input confirmation. Further, instead of the guide image, a guide sound that varies in accordance with the remaining time until an input confirmation may be employed.

(3) The guide image is at least one of an image of a number or a character, an image of a manipulated key, a cursor image of an input character string area, and other displayed image. The guide image varies in a varying cycle of at least one of a color, a brightness, a shape, and a size varies in accordance with the remaining time until an input confirmation. Further, instead of the guide image, a guide sound whose varying cycle varies in accordance with the remaining time until an input confirmation may be employed.

(4) Perform a process that includes a step of accepting information on a character candidate to be a candidate of an input confirmed character, and a step of generating a guide image whose displaying mode varies in accordance with a remaining time until an input confirmation of the character candidate, and a step of displaying the character candidate and the guide image. Further, instead of generating the guide image, generating and producing a guide sound that varies in accordance with a remaining time until an input confirmation may be employed.

In this manner, when the user presses the key, by varying the guide image or the guide sound in accordance with the remaining time until an input confirmation, the user can recognize how long it takes before the character is confirmed, or whether it has already been confirmed. Accordingly, an unintended manipulation can be avoided.

Figure 1:
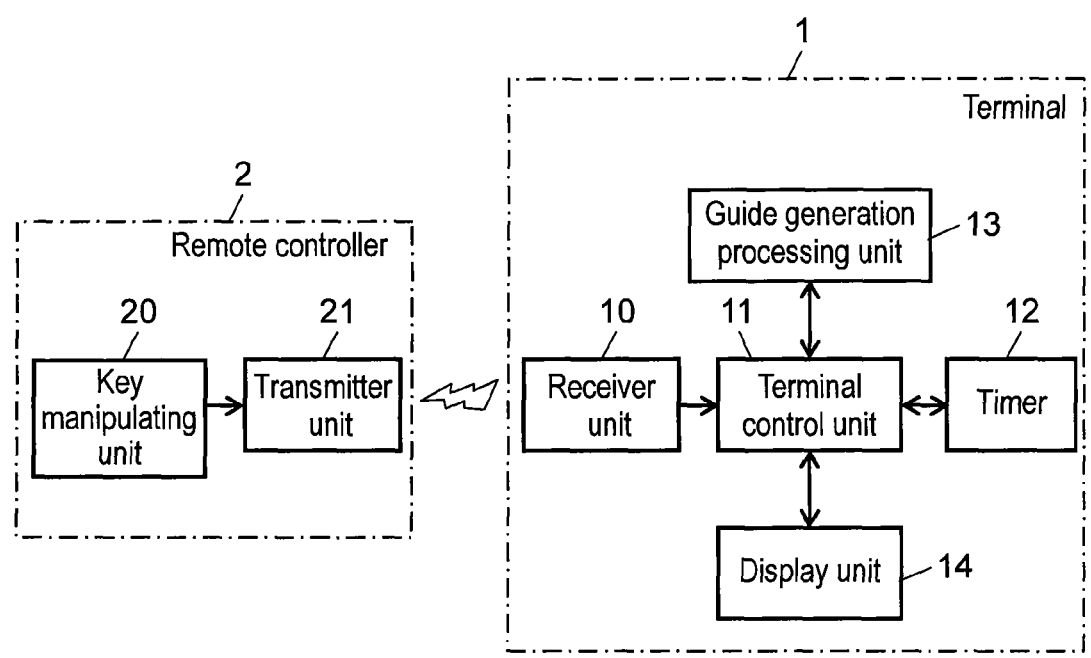
FIG. 1 is a block diagram of a character input device according to a first embodiment of the present invention.

PREFERRED EMBODIMENTS FOR CARRYING OUT OF THE INVENTION (First Embodiment)

In the following, with reference to the drawings, a description will be made of a character input device and a character input method according to embodiments of the present invention. It is to be noted that, in the embodiments, in a case where any component assigned with the identical reference numeral performs the similar operation, the description thereof may not be repeated.

FIG. 1 is a block diagram of a character input device according to a first embodiment of the present invention. In FIG. 1, terminal 1 includes receiver unit 10, terminal control unit 11, timer 12, guide generation processing unit 13, and display unit 14. Remote controller 2 includes key manipulating unit 20 and transmitter unit 21. Similarly to a numerical keypad, keys to which numbers are assigned are arranged on key manipulating unit 20. By pressing each key, a desired number can be selected. To each of the numbers, a plurality of alphabetical characters and kana characters is assigned. When a key is pressed, numerical information capable of identifying the selected number is sent to transmitter unit 21, and transmitter unit 21 transmits the numerical information.

In terminal 1, when receiver unit 10 receives the numerical information from transmitter unit 21, receiver unit 10 passes the received numerical information to terminal control unit 11. Based on the received numerical information, terminal control unit 11 performs a next character candidate selecting process, a guide image displaying process, and a character confirming process. These processes will be described later. Terminal control unit 11 instructs guide generation processing unit 13 to generate a guide image, and guide generation processing unit 13 generates a predetermined guide image based on the instruction. Timer 12 is configured to count time, and has a function of varying the count value at predetermined time intervals from the initial value of such counting. Terminal control unit 11 initializes counting of timer 12, and reads the count value. Further, terminal control unit 11 sends a character image or a guide image required for character input to display unit 14 such that it is displayed thereon.

Figure 2A:
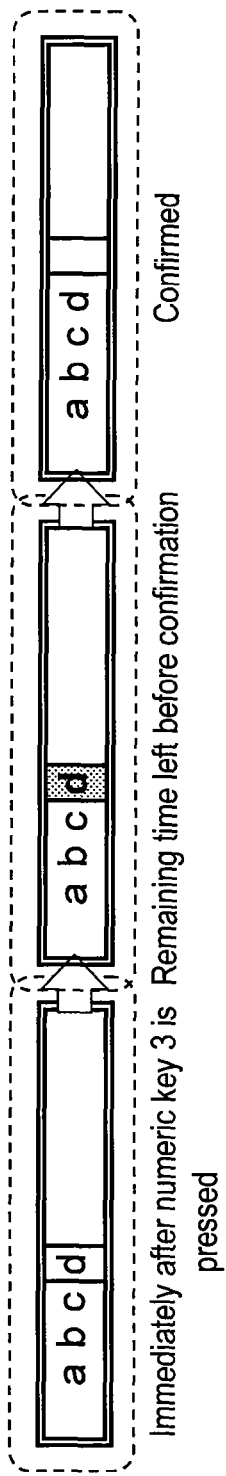
FIG. 2A is a conceptual diagram for describing the displaying manner of an input character string area according to the first embodiment of the present invention.
Figure 2B:
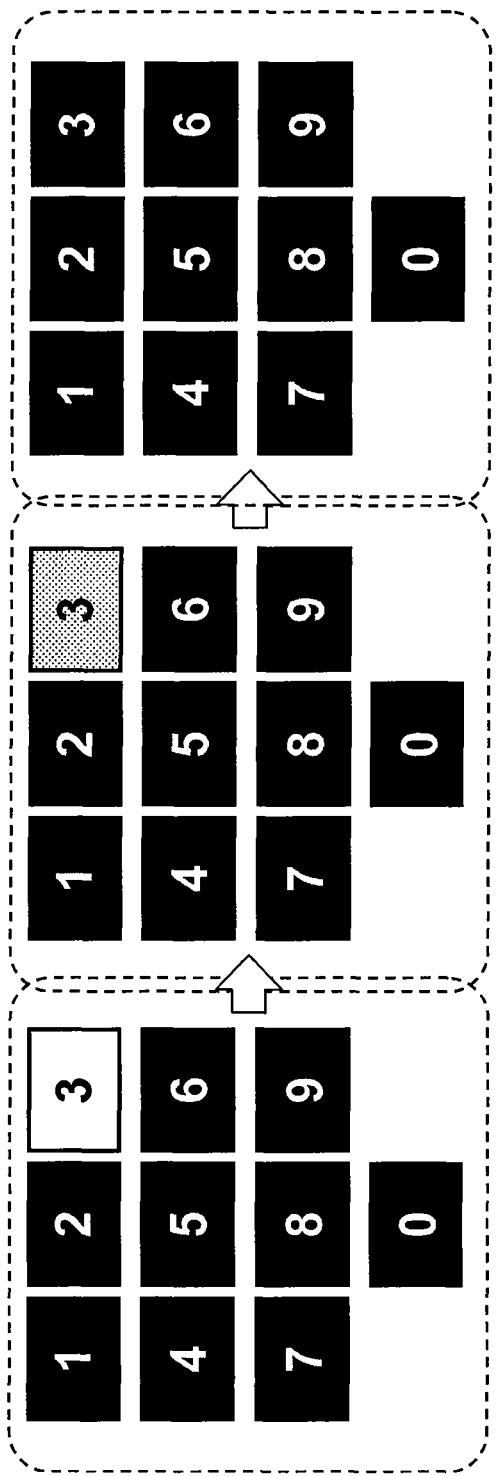
FIG. 2B is a conceptual diagram for describing the displaying manner of numeric keys according to the first embodiment of the present invention.
Figure 2C:
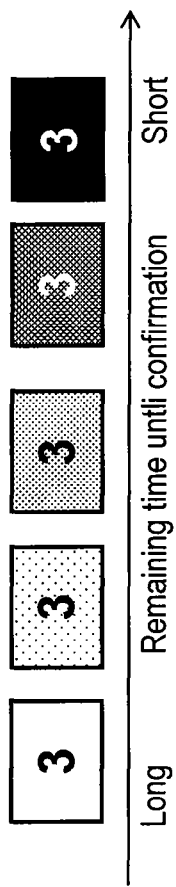
FIG. 2C is a conceptual diagram for describing the displaying manner of a guide image according to the first embodiment of the present invention.

FIG. 2A is a conceptual diagram for describing the displaying manner of an input character string area according to the first embodiment of the present invention. FIG. 2B is a conceptual diagram for describing the displaying manner of numeric keys according to the first embodiment of the present invention. FIG. 2C is a conceptual diagram for describing the displaying manner of a guide image according to the first embodiment of the present invention. The numeric keys of key manipulating unit 20, that is, the numeric keys from 0 to 9 are arranged as shown in FIG. 2B. Further, on display unit 14, similarly to the arrangement of the numeric keys of key manipulating unit 20, images of the numeric keys shown in FIG. 2B are displayed, and the input character string area shown in FIG. 2A is displayed. FIG. 2C shows temporal changes of a guide image. In FIG. 2C, as one example of temporal changes of the guide image, the character is displayed to be gradually brightened and the background of the character is displayed to be gradually darkened as time passes. Such displayed images can be displayed on the display panel when the present invention is applied to a television set.

Next, a description will be made of characters assigned to each numeric key of key manipulating unit 20.

Kana characters are assigned as follows:
"1": uppercase characters and lowercase characters of the "a" row;
"2": characters of the "ka" row;
"3": characters of the "sa" row;
"4": characters of the "ta" row;
"5": uppercase characters of the "na" row;
"6": characters of the "ha" row;
"7": characters of the "ma" row;
"8": uppercase characters and lowercase characters of the "ya" row;
"9": characters of the "ra" row; and
"0": characters of "wa", "wo", and "n".

Alphabetical characters are assigned as follows:
"1": various symbols and special characters;
"2": uppercase characters and lowercase characters of ABC;
"3": uppercase characters and lowercase characters of DEF;
"4": uppercase characters and lowercase characters of GHI;
"5": uppercase characters and lowercase characters of JKL;
"6": uppercase characters and lowercase characters of MNO;

"7": uppercase characters and lowercase characters of PQRS;

"8": uppercase characters and lowercase characters of TUV;

"9": uppercase characters and lowercase characters of WXYZ; and

"0": comma and period.

It is to be noted that, those assigned characters may be shown beside corresponding one of the numbers on the numeric keys.

Next, a description will be made of the functions and operations of terminal 1. In the following description, a character candidate refers to a character before being confirmed, which is waiting for a lapse of a time until an input confirmation. Further, a next character candidate refers to a character that becomes the first character candidate after power is turned ON, or a character to be the next character candidate when the present character candidate is not confirmed.

Figure 3:
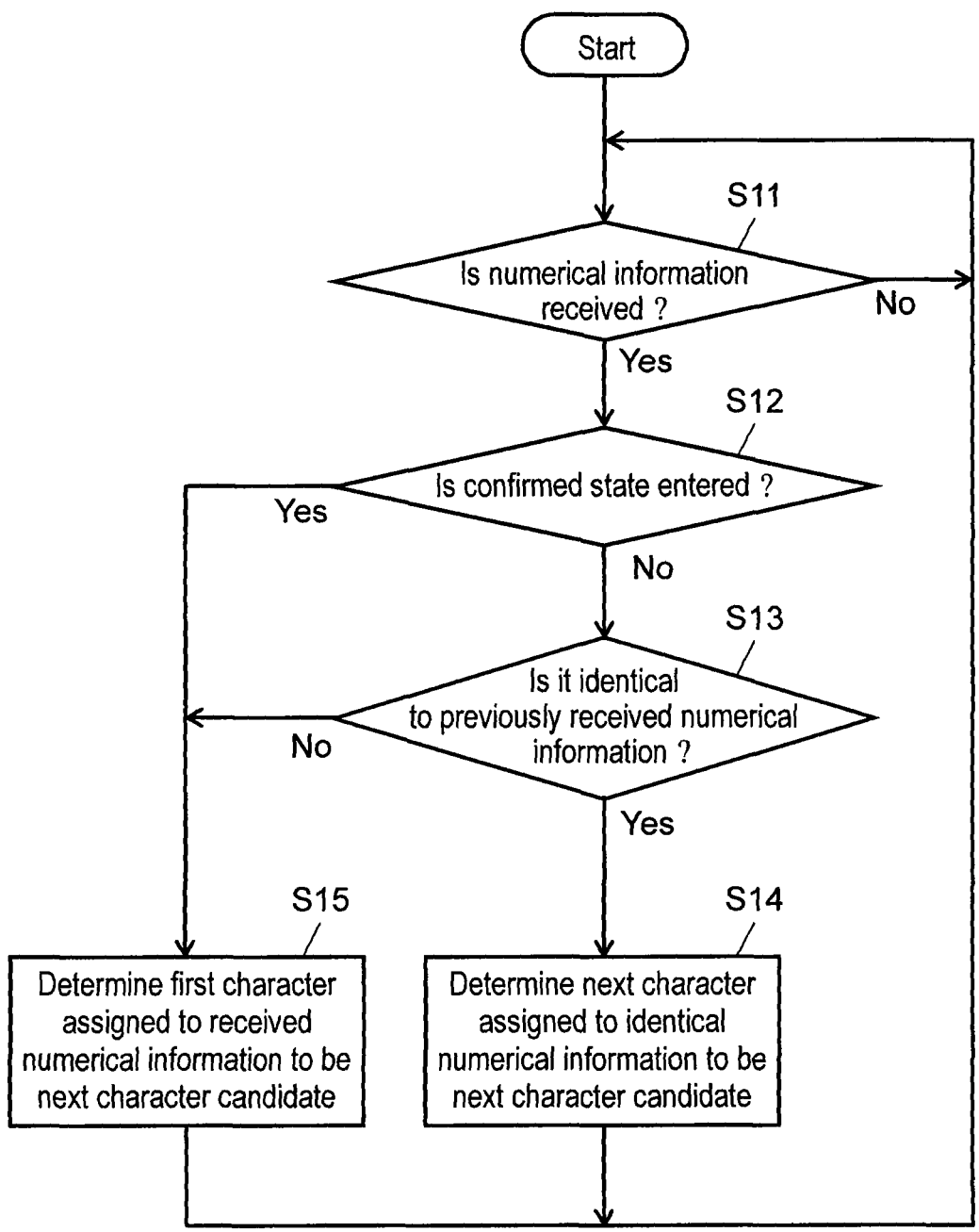
FIG. 3 is a flowchart of a next character candidate selecting process according to the first embodiment of the present invention.

FIG. 3 is a flowchart of the next character candidate selecting process performed by terminal control unit 11 according to the first embodiment of the present invention. Terminal 1 is firstly initialized to enter a confirmed state by the power being turned ON. The confirmed state means that a character input has been confirmed. At the time point immediately after power is turned ON, though no character is input, a tentative confirmed state is entered. Further, since no character has been input, no next character candidate is set at the initial setting.

First, terminal control unit 11 waits for a reception of numerical information from receiver unit 10 (step S11). When the numerical information is received ("Yes" in step S11), control proceeds to step S12, and terminal control unit 11 makes a determination as to the confirmed state. When the confirmed state is determined ("Yes" in step S12), control proceeds to step S15, and terminal control unit 11 defines the first character assigned to the received numerical information as the next character candidate.

On the other hand, when the status is not in the confirmed state ("No" in step S12), terminal control unit 11 waits for a confirmation of any character candidate. That is, the status is the unconfirmed state. Next, terminal control unit 11 determines whether or not the numerical information presently received is identical to the numerical information previously received (step S13). When it is identical ("Yes" in step S13), control proceeds to step S14, and terminal control unit 11 sets the next character assigned to the identical numerical information as the next character candidate. When it is not identical ("No" in step S13), control proceeds to step S15, and terminal control unit 11 sets the first character assigned to the newly received numerical information as the next character candidate.

In parallel to the next character candidate selecting process shown in FIG. 3, terminal 1 performs the guide image displaying process and the character confirming process.

Figure 4:
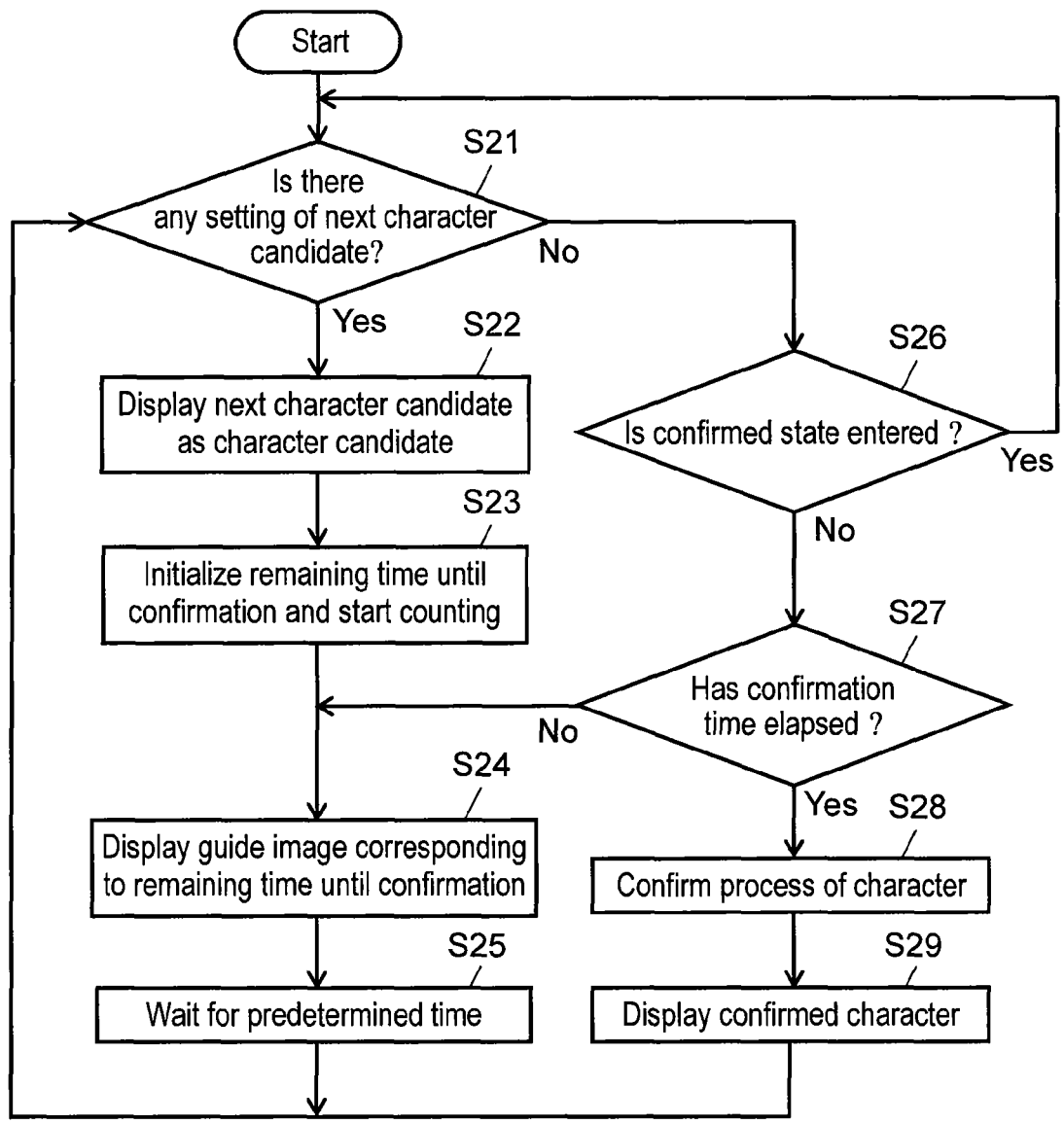
FIG. 4 is a flowchart of a guide image generating process and a character confirming process according to the first embodiment of the present invention.

FIG. 4 is a flowchart of the guide image displaying process and the character confirming process according to the first embodiment of the present invention. As has been described above, terminal 1 is initialized to enter the confirmed state by the power being turned ON. First, terminal control unit 11 determines whether or not a next character candidate has been set (step S21). When no next character candidate has been set in step S14 or S15 in FIG. 3, terminal control unit 11 determines that no next character candidate has been set in step S21 ("No" in step S21). Next, terminal control unit 11 determines whether or not the status is the confirmed state (step S26). When the status is the confirmed state ("Yes" in step S26), control returns to step S21. This loop route causes terminal control unit 11 to wait until the next character candidate is set in the process procedure in step S14 or S15 in FIG. 3.

On the other hand, when the next character candidate has been set in step S14 or S15 in FIG. 3, terminal control unit 11 determines that the next character candidate has been set ("Yes" in step S21). Next, based on the information on the next character candidate having been set in step S14 or S15, a new character candidate is determined, and that character is displayed on display unit 14 (step S22). Examples of the display screen will be described later. Here, because terminal control unit 11 displays the next character candidate having been set, terminal control unit 11 cancels the setting of the next character candidate in steps S14 and S15, such that no next character candidate exists.

Next, terminal control unit 11 initializes the remaining time until a confirmation of a character (step S23). Specifically, terminal control unit 11 initializes the value of time counted by timer 12, and causes timer 12 to start counting time. As one example, timer 12 counts from initial value t=0 to confirmation count value Tk, where: the initial value of time counted by timer 12 is count value t=0, and the count value representing the time from the initialization until a confirmation is referred to as a confirmation count value represented by Tk. Remaining time Tz until an input confirmation with arbitrary count value t is represented by Tz=(Tk−t). Timer 12 may count actual time of day based on the unit of hour, minute, and second. In this case, t is initialized to a time of day when counting is started, and Tk represents the confirmed time of day when a character input is confirmed.

Next, terminal control unit 11 displays a guide image corresponding to remaining time Tz until an input confirmation (step S24). The displaying manner of the guide image is intended to let the user recognize how much time is left before the character confirmation, and specific examples will be given later. Next, terminal 1 waits for a predetermined time (step S25), and thereafter control returns to step S21.

In step S21, terminal control unit 11 determines whether or not the next character candidate has been set, and when not ("No" in step S21), terminal control unit 11 determines whether or not the status is the confirmed state (step S26). When the status is the unconfirmed state ("No" in step S26), terminal control unit 11 proceeds to step S27. Terminal control unit 11 determines whether or not the time until a confirmation has elapsed (step S27). When the count value of timer 12 is t<Tk, terminal control unit 11 determines that the status is unconfirmed; and when t≥Tk, terminal control unit 11 determines that the status is the confirmed state. When unconfirmed ("No" in step S27), terminal control unit 11 proceeds to step S24, and changes the displaying manner of the guide image so as to show the status where remaining time Tz is slightly reduced. Then, terminal control unit 11 proceeds to steps S25 and S21. Each time terminal control unit 11 repeats the route of steps S21, S26, S27, S24, and S25, terminal control unit 11 causes the guide image that shows the reduced remaining time Tz to be displayed. When the count value of timer 12 becomes t≥Tk, terminal control unit 11 determines that the confirmation time has elapsed and the confirmed state is entered ("Yes" in step S27). Next, terminal control unit 11 performs a confirmation process of turning the displayed character candidate into a confirmed character (step S28). Then, the confirmed character is displayed (step S29). The mode of displaying the confirmed character will be described later. Terminal control unit 11 next returns to step S21, and waits for setting of the next character candidate which will occur by an input of the next character.

When the next character candidate has been set in step S14 or S15 in FIG. 3 before the present character candidate is confirmed, terminal control unit 11 determines that the next character candidate has been set ("Yes" in step S21). Terminal control unit 11 causes the next character candidate to be displayed as the character candidate (step S22). That is, terminal control unit 11 does not confirm the present character candidate, and changes the character candidate to the next character candidate, which is a new character, and causes it to be displayed. The process in step S22 is a process of accepting and displaying information on a character candidate being a candidate of an input confirmed character.

Next, terminal control unit 11 proceeds to (step S23), and executes a procedure of a confirmation process for the new character candidate. For example, in a state where the first character "d" is the character candidate by the numeric key "3" in FIG. 2B, when the numeric key "3" is again pressed before a confirmation, the character "e" that follows "d" becomes the new character candidate (step S14). Then, "d" in the cursor area changes to "e" (step S22).

Next, with reference to FIGS. 2A, 2B and 2C, a description will be made of the manner of displaying the character candidate, the manner of displaying the guide image, and the manner of displaying the confirmed character.

In the input character string area shown in FIG. 2A, the already confirmed characters "abc" are displayed. When the key "3" of key manipulating unit 20 of remote controller 2 is pressed, by step S15 in FIG. 3, the alphabetical character "d" which is firstly assigned to the numerical information of the key "3" is selected as the character candidate, and is displayed next to the confirmed characters "abc". The alphabetical character "d" is displayed in a cursor frame such that it can be recognized as the character candidate. The cursor frame may be provided with a predetermined background color. Further, as shown in FIG. 2B, the image of the key "3" is displayed in a color and a brightness being different from those of the other keys not being pressed.

As remaining time Tz until a confirmation reduces, the image of the key "3" is displayed while varying its displaying color or brightness. When the time until a confirmation elapses, the image of the key "3" recovers the same color or brightness as the other keys not being pressed. As shown in FIG. 2C, the image of the key "3" has its brightness or color varied in accordance with a reduction in remaining time Tz until a confirmation. Therefore, the user can recognize approximately how much time is left before a confirmation, or whether the confirmation has already been established.

When the alphabetical character "d" is confirmed, the alphabetical character "d" is displayed next to "abc" in the same background color as "abc". Further, next to "d", solely a cursor in which the next character candidate can be entered is displayed. The user can recognize whether or not the alphabetical character "d" is confirmed by this cursor.

Figure 5:
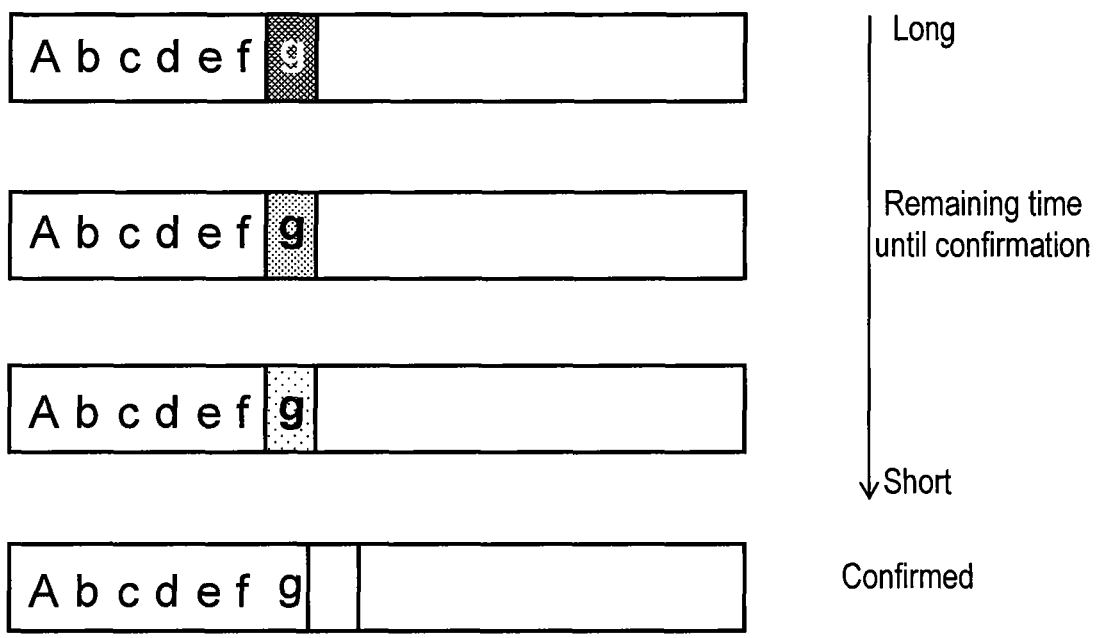
FIG. 5 is a conceptual diagram for describing another example of the guide image according to the first embodiment of the present invention.

FIG. 5 is a conceptual diagram for describing another example of the guide image according to the first embodiment of the present invention. As shown in FIG. 5, it is also possible to let remaining time Tz until a confirmation be recognized by varying the color, brightness, or shape of the cursor of the input character string area.

Figure 6:
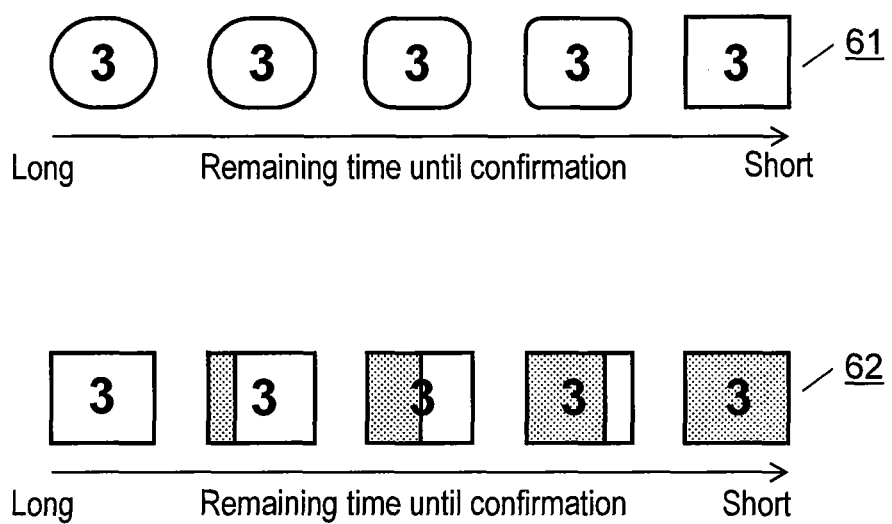
FIG. 6 is a conceptual diagram for describing still another example of the guide image according to the first embodiment of the present invention.

FIG. 6 is a conceptual diagram for describing still another example of the guide image according to the first embodiment of the present invention. The shape of the numeric key shown in FIG. 2C may be set to be a circular shape immediately after being selected, and to gradually resemble a rectangular shape in accordance with a reduction in remaining time Tz until a confirmation. FIG. 6 shows an example of such guide image 61.

Further, by separating the background color region of the numeric key shown in FIG. 2C into areas of two colors, and allowing the boundary of the colors to shift in one direction in accordance with a reduction in remaining time Tz until a confirmation, it becomes possible for the user to grasp remaining time Tz quantitatively. FIG. 6 shows an example of such guide image 62.

Further, remaining time Tz may be shown by a scale indication or a graphical indication. Still further, a guide image that flashes the image of the numeric key or the cursor image to prompt the user to confirm, and that increases the flashing cycle as remaining time Tz reduces may be employed.

It is also possible to allow the color, brightness, size, or shape of the image of the numeric key or the character of the character image on the cursor shown in FIG. 2C to vary in accordance with a reduction in remaining time Tz. Further, the rate of cyclic variation in the color, brightness, or size of the character of the character image may be varied in accordance with a reduction in remaining time Tz.

It is also possible to, in order to let remaining time Tz be recognized, allow an image other than the image of the numeric key or the cursor to be displayed on display unit 14, and to vary the color, brightness, shape or the like, or to vary the rate of cyclic variation in the color, brightness, size or the like, in accordance with a reduction in remaining time Tz until an input confirmation. That is, the guide image is at least one of an image of number or character, an image of the manipulated key, a cursor image of the input character string area, and the other displayed images (for example, an image of the scale indication or the graphical indication described above). Additionally, the guide image may be an image whose at least one of color, brightness, shape, and size varies, or may be an image whose varying cycle of at least one of the color, the brightness, the shape, and the size varies in accordance with remaining time Tz.

Generation of the numeric key image, the input character string area, the image of each character, and the cursor image by guide generation processing unit 13 can be realized using well-known technique.

As has been described above, in terminal 1, every time receiver unit 10 receives numerical information from remote controller 2, and receiver unit 10 sends the received numerical information to terminal control unit 11, terminal control unit 11 determines whether or not the numerical information is identical. When the numerical information is identical, terminal control unit 11 determines it to be an instruction to change the character candidate, in which the character being displayed and assigned to that number is to be changed to the next character.

When it is determined that the numerical information is not identical, terminal control unit 11 considers that another numeric key is pressed, and determines it to be an instruction to change the character candidate, in which the character candidate being displayed is to be changed to the first one of the characters assigned to the new numerical information. Accordingly, every time any numeric key is pressed, a new character candidate is always selected, and an input character waiting for confirmation is cleared.

For the communication between transmitter unit 21 and receiver unit 10, infrared communication can be applied. In the foregoing description, key manipulating unit 20 is numeric keys to which numbers are assigned, and alternatively the present invention is applicable to character keys to which characters are assigned. In such a case where character keys are employed, instead of the numerical information, character information is transmitted from remote controller 2 to terminal 1. Accordingly, in the foregoing description, the numerical information can be replaced with key information of remote controller 2. Further, the character assignment to the numeric keys is not limited to the example described above.

In association with the confirmation process of the character (step S27), a process of writing the confirmed character information in a storage unit such as a register where the confirmed character string is stored may be performed. Alternatively, confirmed state identification information may previously be provided, and a process of exchanging this information from "unconfirmed state" to "confirmed state" may be performed. In this case, in step S22, a process of exchanging the confirmed state identification information from "confirmed state" to "unconfirmed state" must also be performed.

The character candidate selecting method described in the foregoing with reference to flowchart of FIG. 3 may be replaced by another selecting method.

Further, by reducing the counting rate of timer 12, or by assigning a great value to confirmation count value Tk, which represents the time from initialization until an input confirmation, to thereby prolong the confirmation time, the input work becomes easier for the user unaccustomed to manipulate keys. On the other hand, for the user accustomed to manipulate keys, by increasing the counting rate or by assigning a small value to confirmation count value Tk, it becomes possible to input many characters in a short time. Further, it is also possible to allow user to set a desired value to the counting rate or confirmation count value Tk.

A character input device according to the first embodiment includes: terminal control unit 11 that accepts information on a character candidate being a candidate of an input confirmed character, and performs a character candidate displaying process, and generates a guide image whose image varies in accordance with remaining time Tz until an input confirmation of the character candidate; and display unit 14 that displays the character candidate and the guide image. In the foregoing description, the numerical information received by receiver unit 10 is not the information on a character candidate to be the candidate of the input confirmed character. The information on a character candidate to be the candidate of the input confirmed character is the information on the character acquired by terminal control unit 11 in step S21 and S22 through the next character candidate setting set in steps S14 and S15.

In the foregoing description, the exemplary case of key manipulating unit 20 in which keys are manipulated is shown. Alternatively any mechanical manipulation means other than keys may be employed as means for inputting characters.

In the foregoing description, the guide image is varied in accordance with remaining time Tz. Alternatively remaining time Tz may be reported to the user by sound. It is also possible to generate a guide sound having particular tone or pitch at the time of initialization of timer 12, so that the guide sound gradually becomes smaller in accordance with a reduction in remaining time Tz. Then, when the sound ceases, the character candidate being displayed may be set as the confirmed character. For this purpose, guide generation processing unit 13 should generate the guide sound instead of the guide image, and should cause the guide sound to be produced from a speaker (not-shown). That is, in step S24, a process of generating and producing a guide sound corresponding to remaining time Tz until a confirmation should be carried out.

As to the guide sound, frequency or tone of the sound may be varied. Further, it is also possible to employ a guide sound whose varying cycle of the fundamental frequency of the sound, modulation cycle of amplitude modulation of the sound, varying cycle of the tone or the like is varied from a long cycle to a short cycle in accordance with remaining time Tz. Still further, it is also possible to employ a guide sound whose frequency of the sound or scale increases in accordance with a reduction in remaining time Tz.

Accordingly, when a sound is employed as the guide information, terminal control unit 11 generates a guide sound whose at least one of sound volume, frequency, and tone varies, or whose varying cycle of at least one of a sound volume, a frequency, and a tone varies, in accordance with remaining time Tz until an input confirmation of the character candidate, instead of the guide image, and causes such a guide sound to be produced from a speaker (not shown) or the like. Here, display unit 14 displays the character candidate. It is to be noted that, both the guide image and the guide sound may be presented to the user. In this manner, the character input device may include terminal control unit 11 and display unit 14 that displays the character candidate.

It is to be noted that, though terminal control unit 11 and guide generation processing unit 13 are separately provided in the foregoing description, it is also possible to structure guide generation processing unit 13 to be included as part of terminal control unit 11. For example, by implementing the character input methods shown in FIGS. 3 and 4 with one piece of software, guide generation processing unit 13 can be included as part of terminal control unit 11.

As has been described above, a character input method according to the first embodiment may include: a step of accepting information on a character candidate to be the candidate of an input confirmed character; and a step of generating and producing a guide sound whose at least one of a sound volume, a frequency and a tone varies, or whose varying cycle of at least one of the sound volume, the frequency and the tone varies, in accordance with a remaining time until an input confirmation of the character candidate.

(Second Embodiment)

Figure 7:
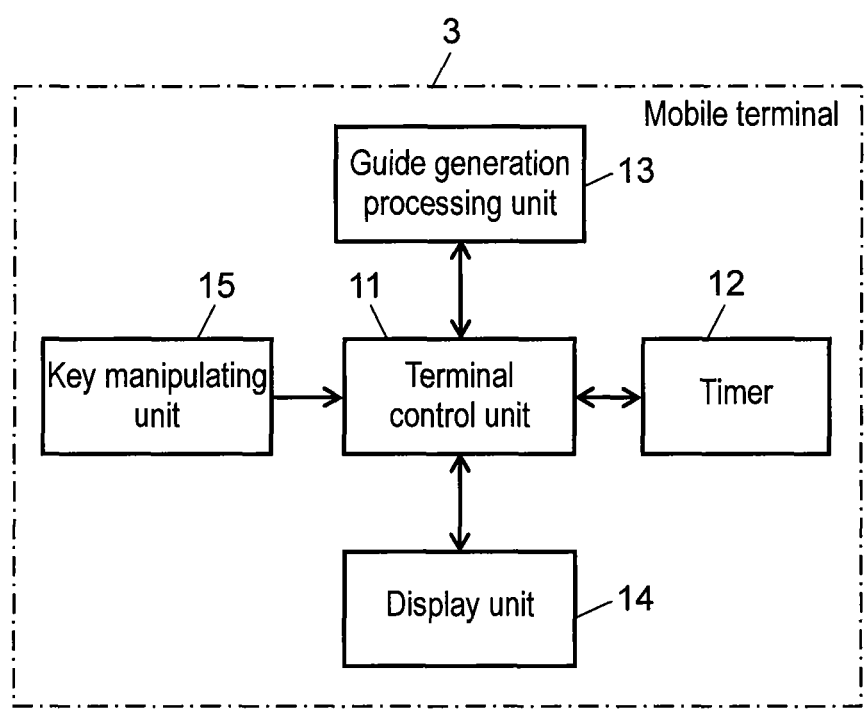
FIG. 7 is a block diagram of a character input device according to a second embodiment of the present invention.

In the first embodiment, as shown in FIG. 1, the description has been made of the character input device that includes remote controller 2 being a manipulating unit to be manipulated for inputting characters, separately from terminal control unit 11 and display unit 14. In contrast thereto, in a second embodiment, the manipulating unit to be manipulated for inputting characters may be integrated with terminal control unit 11 and with display unit 14. FIG. 7 is a block diagram of a character input device according to the second embodiment of the present invention, showing an exemplary structure of mobile terminal 3 in which key manipulating unit 15 is integrated with the terminal. A typical example of mobile terminal 3 may be a mobile phone.

Key manipulating unit 15 is similarly structured as key manipulating unit 20. The numerical information output from key manipulating unit 15 is directly supplied to terminal control unit 11. The operation of terminal control unit 11 according to the second embodiment is similar to that described in connection with the first embodiment.

It is possible to cause each key of key manipulating unit 15 to emit light employing a light emitting diode whose color or brightness can be varied, such that the color or brightness of each key varies in accordance with remaining time Tz until an input confirmation.

It is also possible to arrange the keys of key manipulating unit 15 to be displayed on a liquid crystal touch panel, such that the color, brightness, shape or the like of each key displayed using liquid crystal varies in accordance with remaining time Tz until an input confirmation.

(Third Embodiment)

In the first and second embodiments, the description has been made of the character input device and the character input method in which a plurality of characters is assigned to one key. In contrast thereto, in a third embodiment, one character is assigned per key.

In the third embodiment, the process procedure shown in flowchart of FIG. 3 is not necessary. Instead, when numerical information is received, a process of setting one character assigned to the numerical information as the next character candidate will suffice. That is, at least one of a single character and a plurality of characters may be assigned per key.

This manner is advantageous in that, even when an unintended numeric key is pressed, since the input character is displayed for a while, the user will not overlook such an unintended input, and can press the correct numeric key before a confirmation.

(Fourth Embodiment)

In the first, second and third embodiments, the description has been made of the method of performing an automatic confirmation, which is performed by waiting for a lapse of the confirmation time and without performing a manipulation of confirming the character candidate. Conventionally known manipulations, such as a manipulation of pressing another numeric key or any key other than numeric keys such as a four-way key, to confirm the character candidate previously input or the like is not taken into consideration.

In the fourth embodiment, a conventional manipulation, such as a manipulation of pressing another numeric key or any key other than numeric keys such as a four-way key, to confirm the character candidate previously input or the like may be combined with the first, second, and third embodiments. For this purpose, in parallel to the next character candidate selecting process, the guide generating process and the character confirming process which have been described with reference to FIGS. 3 and 4, terminal control unit 11 should perform a process of manipulating pressing another numeric key or any key other than numeric keys such as a four-way key, to confirm the character candidate previously input, and a process of displaying a further new character candidate. That is, terminal control unit 11 according to the fourth embodiment accepts information on a character candidate to be a candidate of an input confirmed character by a manipulation of any key; and in a case where another key is pressed while the displaying mode of a guide image is varying, performs a process of confirming the information on a character candidate, to display a further new character candidate.

In this manner, user accustomed to manipulate keys can proceed with the input work without waiting for a lapse of the confirmation time, and user unaccustomed to manipulate keys can proceed with the input work after a lapse of the confirmation time.

(Fifth Embodiment)

In a fifth embodiment, when a word or a character string is input, a character string, such as a word which is highly possibly used to follow that preceding word or the character string, is referred to as an input candidate of a character string which follows the word or the character string having been input. A character input method according to the fifth embodiment is that input candidates are displayed on display unit 14 as a pull-down menu, and in selecting one of the input candidates to confirm the input, the selected input candidate is displayed having its predetermined portion varied in accordance with remaining time Tz until an input confirmation, so as to serve as a guide image.

Figure 8:
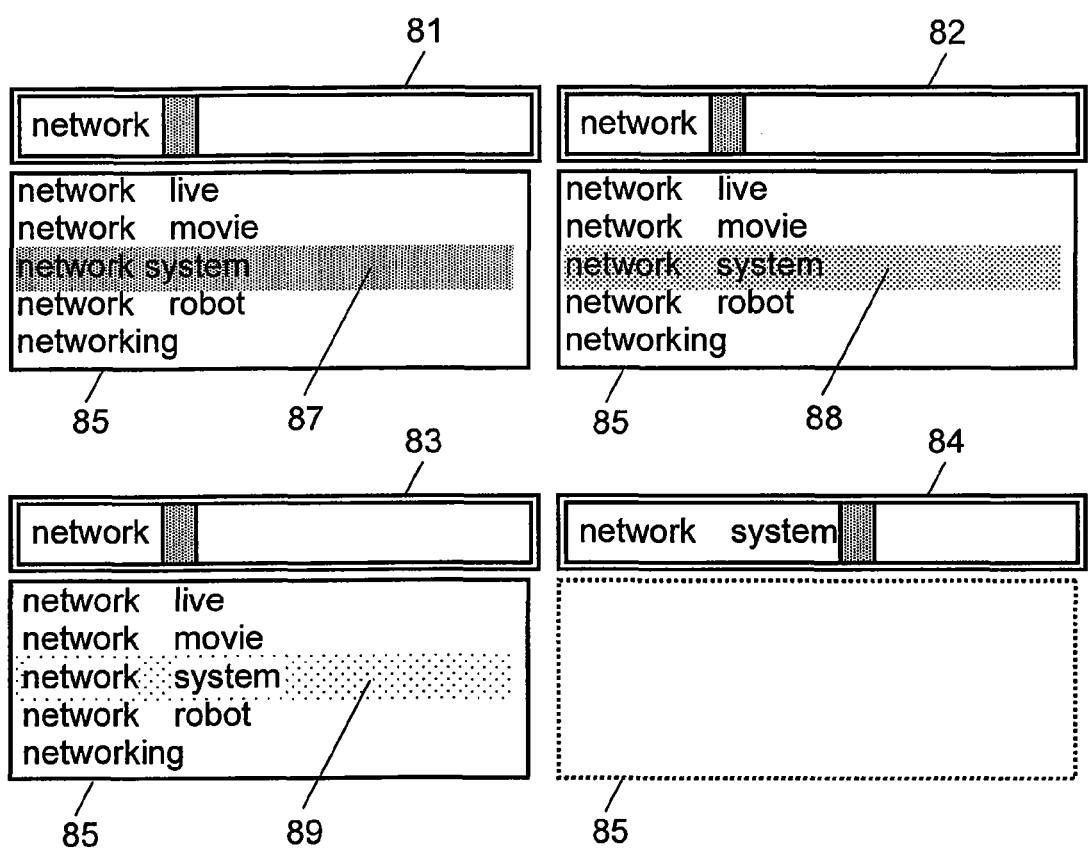
FIG. 8 is a conceptual diagram for describing an example of a guide image according to a fifth embodiment of the present invention.
Figure 9:
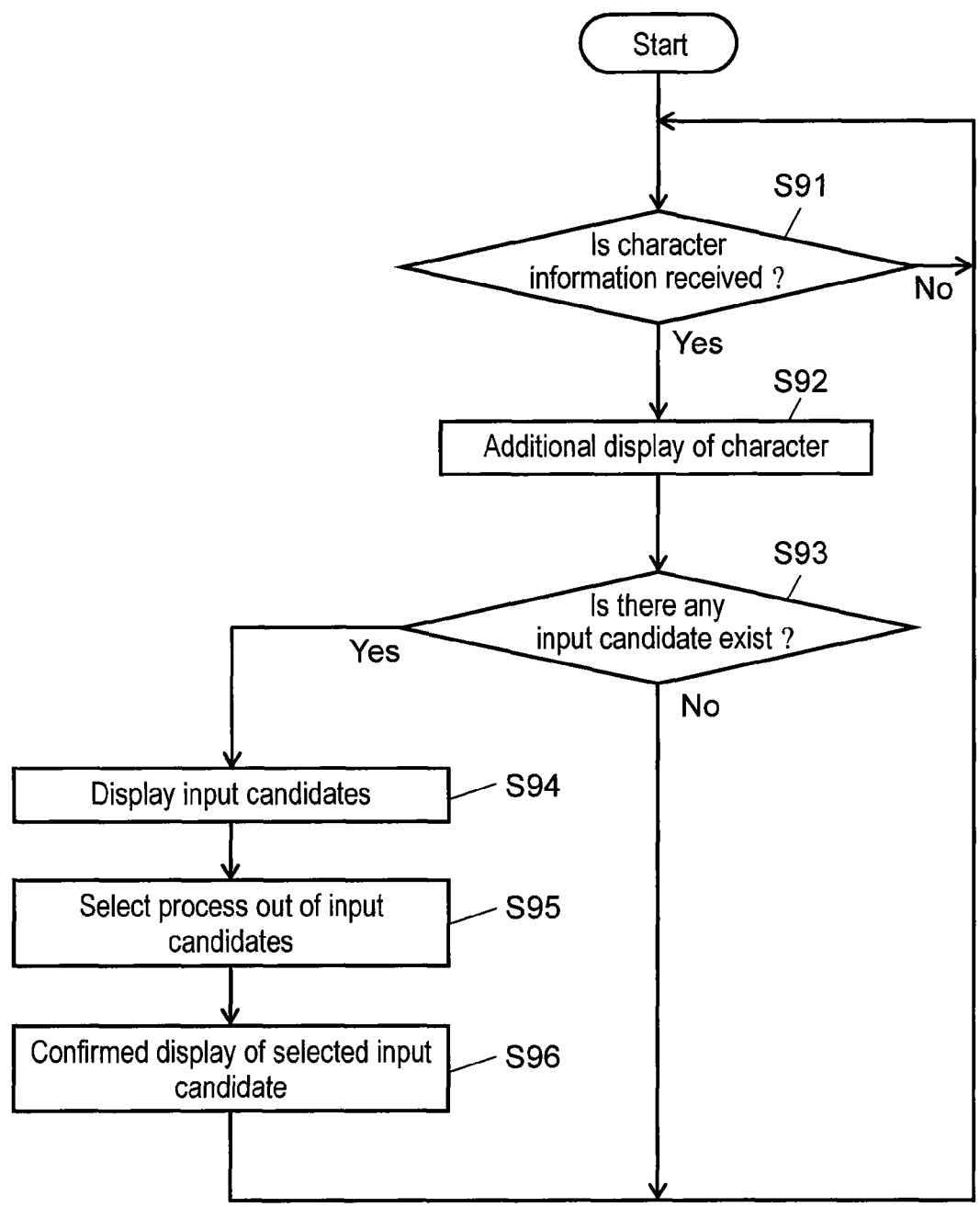
FIG. 9 is a flowchart of a character confirming process according to the fifth embodiment of the present invention.
Figure 10:
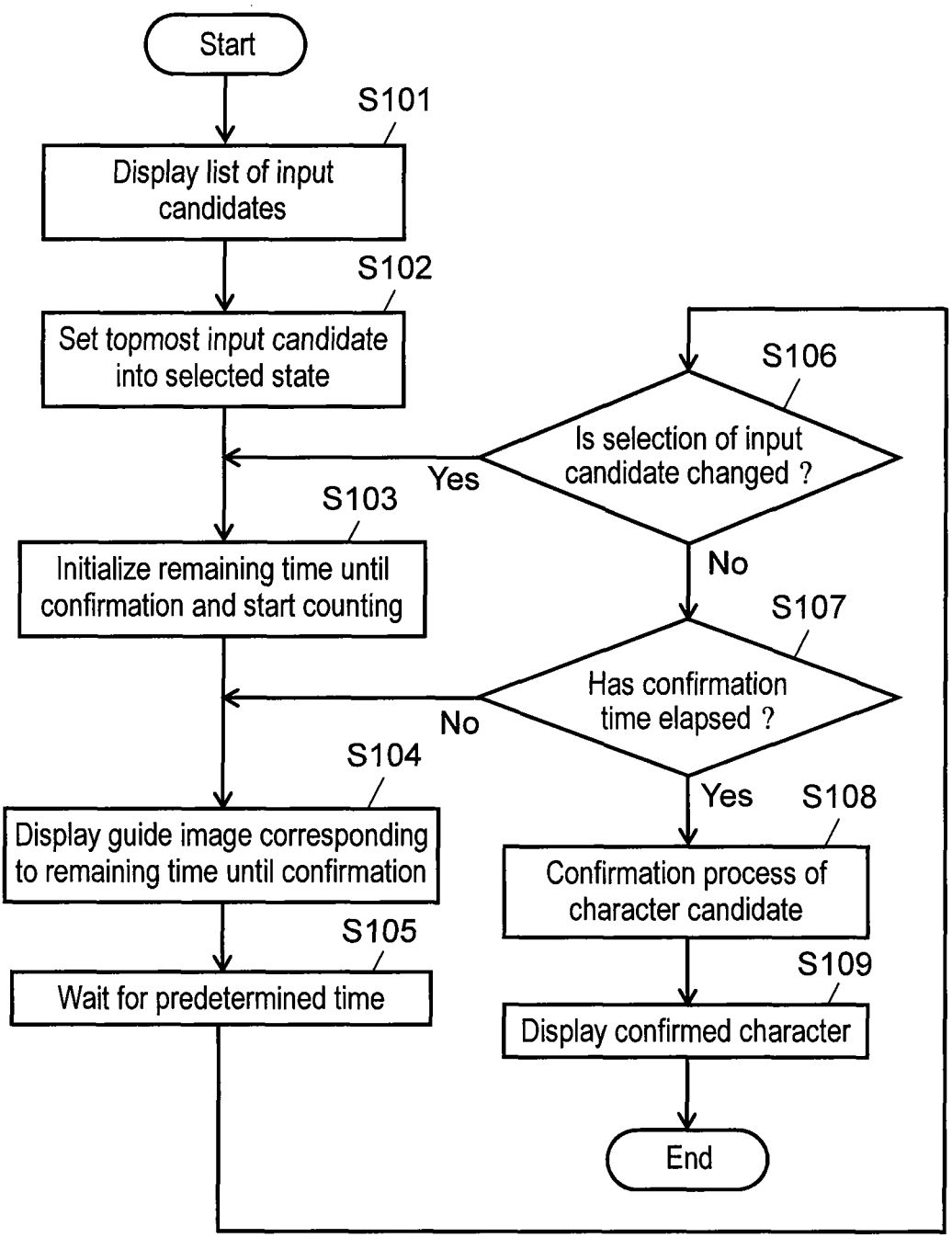
FIG. 10 is a flowchart of an input candidate selecting process according to the fifth embodiment of the present invention.

A description will be made of operations of terminal control unit 11, timer 12, guide generation processing unit 13, and display unit 14 shown in FIG. 1, with references to examples of guide image 87, 88, and 89 shown in FIG. 8 and the flowcharts of FIGS. 9 and 10. FIG. 8 is a conceptual diagram for describing examples of guide image 87, 88, and 89 according to the fifth embodiment of the present invention. FIG. 9 is a flowchart of a character confirming process according to the fifth embodiment of the present invention. FIG. 10 is a flowchart of an input candidate selecting process according to the fifth embodiment of the present invention.

As shown in FIG. 9, first, terminal control unit 11 waits for reception of character information (step S91). The character information to be received in this step may be character information supplied from receiver unit 10 to terminal control unit 11. As terminal control unit 11 receives character string information such as "network" shown in FIG. 8 on a character-by-character basis by manipulations of key manipulating unit 20, terminal control unit 11 adds such characters one by one to be displayed, to display a character string "network" in input character string area 81 indicated by a double frame (step S92). Next, terminal control unit 11 determines whether or not any character string corresponding to "network" exists as an input candidate (step S93). When it exists as an input candidate ("Yes" in step S93), terminal control unit 11 displays one input candidate or a plurality of input candidates in pull-down menu area 85 of display unit 14 (step S94). In an example of FIG. 8, five character strings of "network live", "network movie", "network system", "network robot", and "networking" are displayed in pull-down menu area 85 as input candidates for "network".

When the user selects one of the character strings "network system" out of the input candidates in pull-down menu area 85 (step S95), terminal control unit 11 performs a confirmation process employing the character string "network system" as the character candidate being the candidate of the input confirmed character (step S96). That is, terminal control unit 11 causes guide generation processing unit 13 to generate guide image 87, 88, and 89, in which the background color of a row of character string "network system" gradually varies in accordance with remaining time Tz until an input confirmation, and causes display unit 14 to display the same (step S95). When the count value of timer 12 reaches confirmation count value Tk, that is, when remaining time Tz reaches zero, the character candidate selected out of the input candidates is confirmed as the confirmed character. Then, terminal control unit 11 causes the character string "network system" to be displayed as the confirmed character in input character string area 84 of display unit 14 (step S96). Next, terminal control unit 11 returns to step S91, and waits for the next character information.

FIG. 10 is a detailed flowchart corresponding to steps S94, S95, and S96 shown in FIG. 9. First, terminal control unit 11 causes a list of character strings of input candidates to be displayed in pull-down menu area 85 (step S101). Next, terminal control unit 11 causes the topmost input candidate in pull-down menu area 85 to enter the selected state (step S102). In the example of FIG. 8, "network live" is the topmost. Then, terminal control unit 11 causes timer 12 to initialize the remaining time until an input confirmation, and to start counting (step S103). Next, terminal control unit 11 causes guide image 87, 88, and 89 which is in accordance with remaining time Tz until an input confirmation to be displayed (step S104). Though not shown in FIG. 8, the background color of the character string "network live" in pull-down menu area 85 is changed to a color corresponding to remaining time Tz. Next, terminal control unit 11 waits for a certain time (step S105), and thereafter proceeds to step S106. Then, terminal control unit 11 determines whether or not any change in the selection of the input candidate is made (step S106).

When the selection out of the input candidates is changed from "network live" to "network system" by any manipulation performed with remote controller 2 ("Yes" in step S106), terminal control unit 11 causes timer 12 to initialize the time until an input confirmation, and to start counting (step S103). "network system" becomes the character candidate being the candidate of the input confirmed character. Terminal control unit 11 causes guide image 87, 88, and 89 to be displayed so as to be in accordance with remaining time Tz until an input confirmation (step S104). That is, terminal control unit 11 changes the background color of the character string "network system" in pull-down menu area 85 to a color corresponding to remaining time Tz. Next, terminal control unit 11 waits for a certain time (step S105), and subsequently proceeds to step S106. Terminal control unit 11 determines whether or not any change in the selection of the input candidate is made (step S106).

On the other hand, when no change in the selection of the input candidate is made ("No" in step S106), terminal control unit 11 determines whether or not timer 12 has counted a lapse of confirmation count value Tk (step S107). When the confirmation time has not elapsed ("No" in step S107), by the loop process formed by steps S104, S105, S106, and S107, terminal control unit 11 changes the background color of the character string "network system" in accordance with remaining time Tz. Guide image 87, 88, and 89 in FIG. 8 show the state where the background color changes from black to white through gray.

When timer 12 reaches confirmation count value Tk, or exceeds confirmation count value Tk, that is, when the confirmation time has elapsed ("Yes" in step S107), terminal control unit 11 performs a confirmation process of the selected input candidate (step S108). Then, terminal control unit 11 causes the confirmed character string "network system" to be displayed in input character string area 84 (step S109), and ends the displaying operation with pull-down menu area 85.

In contrast to the first embodiment where one single character is treated as the character candidate, in the fifth embodiment, a character string is treated as the character candidate. Specifically, an input candidate which is a character string following the word having been input and followed by a character string that is highly possible to follow the input word is displayed in pull-down menu area 85 as the character candidate.

A character input device according to the fifth embodiment includes: terminal control unit 11 that accepts information on a character candidate to be a candidate of an input confirmed character and that performs a displaying process of the character candidate in pull-down menu area 85 in steps S102 and S106, and that generates guide image 87, 88, and 89 whose displaying mode varies in accordance with remaining time Tz until an input confirmation in step S104; and display unit 14 that displays the character candidate and guide image 87, 88, and 89.

A character input method according to the fifth embodiment includes: steps S102 and S106 of accepting information on a character candidate to be a candidate of an input confirmed character at terminal control unit 11; step S104 of performing a displaying process of the character candidate in pull-down menu area 85, and generating guide image 87, 88, and 89 whose displaying mode varies in accordance with remaining time Tz until an input confirmation of the character candidate; and steps S101 and S104 of displaying the character candidate and guide image 87, 88, and 89 on display unit 14.

Though FIG. 8 shows an input example of alphabetical characters, the displaying manner of guide image 87, 88, and 89 in accordance with remaining time Tz until an input confirmation can also be performed in performing the kana to kanji conversion for hiragana input, in which a plurality of kanji candidates is juxtaposed to one another to be displayed in pull-down menu area 85 as input candidates, and the user selects one of them as a character candidate to be the candidate of the input confirmed character.

It is to be noted that, the description has been made of the fifth embodiment for an example of the character string with a plurality of characters, such as a character string "network". Alternatively the following manner is also possible: for example, when "n" is input, words starting with "n" out of the character strings having recently been input are juxtaposed to one another to be displayed in pull-down menu area 85 as input candidates, in order of higher frequency of use, or in reverse date order of use. In other words, in a case where any character or a character string is input, character strings associated with the character or the character string may be juxtaposed to one another to be displayed as input candidates in pull-down menu area 85.

It is to be noted that, in the fifth embodiment, the image whose background color of the whole character string "network system" varies is shown as guide image 87, 88, and 89. Alternatively, it is also possible to use an image in which the background color of the portion corresponding to "system" varies may be employed as the guide image.

Further, in the fifth embodiment, the background color is varied as guide image 87, 88, and 89. Alternatively, various guide images described in connection with the first embodiment may be employed. Further, instead of guide image 87, 88, and 89, a guide sound whose description has been made in connection with the first embodiment may be employed.

Further, as another guide image, the black and white inversion state of the characters of the character string "network system" in FIG. 8 may be changed in order of "n"→"e"→"t"→"w"→"o"→"r"→"k"→"s"→"y"→"s"→"t"→"e"→"m", and a black and white inversion state changing rate may be accelerated in accordance with a reduction in remaining time Tz. Accelerating the changing rate of the black and white inversion state, the shifting rate of the inverted portion is accelerated. Further, it is also possible to cause the brightness or color of the background of the character string "network system" in FIG. 8 to cyclically change, and to cause the cycle be accelerated in accordance with a reduction in remaining time Tz.

(Sixth Embodiment)

In a sixth embodiment, also in a case in which, after a certain word is input and confirmed, one character string is selected out of follower candidates that are each a character string such as a word being highly possible to follow the confirmed word and subjected to an input confirmation, the guide image is displayed in a manner in which displaying mode of a predetermined portion of the character string being the selected follower candidate is varied in accordance with remaining time Tz until an input confirmation. To this end, a procedure in which part of the flowcharts of FIGS. 9 and 10 is modified as follows is employed. Further, with reference to FIG. 8, a description will be made of a displaying manner of guide image 87, 88, and 89.

First, terminal control unit 11 waits for reception of confirmed character information (step S91). The confirmed character information may be obtained, for example, in step S28 in the flowchart of FIG. 4. Further, the character information received in step S91 may be character information supplied from receiver unit 10 to terminal control unit 11. As terminal control unit 11 receives character string information such as "network" by manipulations of key manipulating unit 20, terminal control unit 11 displays the character string "network" in input character string area 81 indicated by a double frame (step S92). Next, terminal control unit 11 determines whether or not any character string exists as a follower candidate that follows the confirmed character string "network", in a state where the character string "network" has been subjected to input confirmation (step S93). When it exists as a follower candidate ("Yes" in step S93), terminal control unit 11 displays one follower candidate or a plurality of follower candidates in pull-down menu area 85 of display unit 14 (step S94). For example, as the character strings following "network", five character strings of "live", "movie", "system", "robot", and "ing" are displayed in pull-down menu area 85 as the follower candidates. At this time, the confirmed "network" is not displayed in pull-down menu area 85.

When the user selects one character string "system" out of the follower candidates in pull-down menu area 85, terminal control unit 11 performs a selection process employing the character string "system" as the character candidate being the candidate of the input confirmed character. Further, terminal control unit 11 causes guide generation processing unit 13 to generate guide image 87, 88, and 89, in which the background color of the character string of a row of "system" gradually varies in accordance with remaining time Tz until an input confirmation, and causes display unit 14 to display the same (step S95). When the count value of timer 12 reaches confirmation count value Tk, remaining time Tz becomes zero, and the character candidate selected out of the follower candidates is confirmed as the confirmed character. Then, terminal control unit 11 causes the character string "system" to be displayed as the confirmed character next to the character string "network" in input character string area 84 of display unit 14 (step S96). Next, terminal control unit 11 returns to step S91, and waits for the next character information.

Next, a description will be made with reference to FIG. 10, which is a detailed flowchart corresponding to steps S94 to S96 shown in FIG. 9. Terminal control unit 11 causes a list of character strings of the follower candidates to be displayed in pull-down menu area 85 (step S101). Next, terminal control unit 11 causes the topmost follower candidate "live" in pull-down menu area 85 to enter the selected state (not shown) (step S102). Then, terminal control unit 11 causes timer 12 to initialize the time until an input confirmation, and to start counting (step S103). Next, terminal control unit 11 causes a guide image (not shown) corresponding to remaining time Tz until an input confirmation to be displayed (step S104). Terminal control unit 11 changes the background color of the character string "live" being the follower candidate in pull-down menu area 85 to a color corresponding to remaining time Tz. Next, terminal control unit 11 waits for a certain time (step S105), and thereafter proceeds to step S106. Then, terminal control unit 11 determines whether or not any change in the selection of the follower character is made (step S106).

When the selection out of the follower candidates is changed from "live" to "system" by any manipulation performed with remote controller 2 ("Yes" in step S106), terminal control unit 11 causes timer 12 to initialize the time until an input confirmation, and to start counting (step S103). "system" becomes the character candidate being the candidate of the input confirmed character. Then, terminal control unit 11 causes guide image 87, 88, and 89 to be displayed so as to be in accordance with remaining time Tz until an input confirmation (step S104). That is, terminal control unit 11 changes the background color of the character string "system" being the follower candidate in pull-down menu area 85 to a color corresponding to remaining time Tz. Next, terminal control unit 11 waits for a certain time (step S105). Next, terminal control unit 11 determines whether or not any change in the selection of the follower candidate is made (step S106).

When no change in the selection of the follower candidate is made ("No" in step S106), terminal control unit 11 determines whether or not count value t of timer 12 has counted a lapse of confirmation count value Tk (step S107). When confirmation count value Tk has not elapsed ("No" in step S107), terminal control unit 11 changes the background color of the character string "system" being the follower candidate in accordance with remaining time Tz, by the loop process formed by steps S104, S105, S106, and S107. Then, when count value t of timer 12 reaches confirmation count value Tk, or exceeds confirmation count value Tk ("Yes" in step S107), terminal control unit 11 performs a confirmation process of the selected follower character (step S108). Next, terminal control unit 11 causes the confirmed character string "system" to be displayed next to the character string "network" in input character string area 84 (step S109). Then, the displaying operation with pull-down menu area 85 ends.

In the sixth embodiment, character strings that are highly possible to follow the confirmed character string are displayed as follower candidates in pull-down menu area 85. Then, one of them is selected as the character candidate to be the candidate of the input confirmed character.

A character input device according to the sixth embodiment includes: terminal control unit 11 that accepts information on a character candidate to be a candidate of an input confirmed character in the processes of steps S102 and S106, that performs a displaying process of the character candidate in pull-down menu area 85, and that generates guide image 87, 88, and 89 whose displaying mode varies in accordance with remaining time Tz until an input confirmation of the character candidate in step S104; and display unit 14 that displays the character candidate and guide image 87, 88, and 89.

It is to be noted that, the guide image is not limited to those whose background color varies, and various guide images described in connection with the first embodiment may be employed. Further, instead of the guide image, a guide sound whose description has been made in connection with the first embodiment may be employed.

Further, as another guide image, it is possible to set such that the characters of the character string "system" change the black and white inversion state in order of " "→"s"→"y"→"s"→"t"→"e"→"m", and such that a black and white inversion state changing rate is accelerated in accordance with a reduction in remaining time Tz. Accelerating the changing rate of the black and white inversion state, the shifting rate of the inverted character is accelerated. Further, it is possible to cause the brightness or color of the background of the character string "system" to cyclically change, and to cause the cycle be accelerated in accordance with a reduction in remaining time Tz.

As has been described above, terminal control unit 11 of the character input device according to the sixth embodiment may confirm the character candidate, and thereafter display the character candidates in descending order of probability of being selected so as to follow the character candidate and being subjected to an input confirmation.

(Seventh Embodiment)

Figure 11:
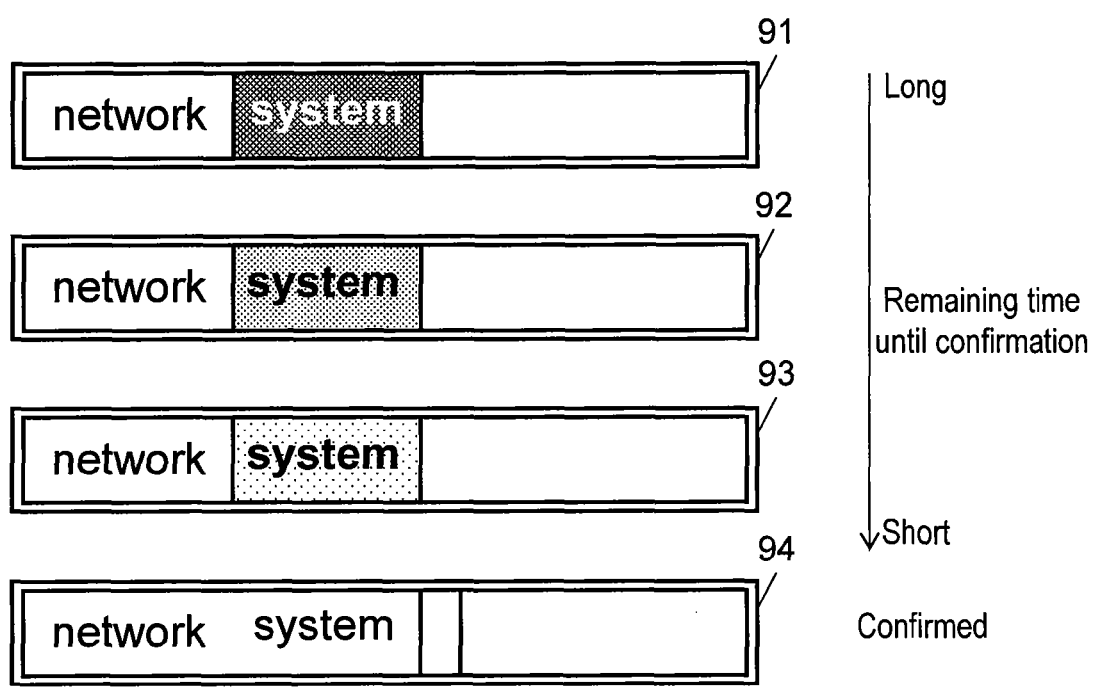
FIG. 11 is a conceptual diagram for describing an example of a guide image according to a seventh embodiment of the present invention.

A seventh embodiment is an application of the present invention to the character input autocomplete method. In the following, a description will be made thereof with reference to FIG. 11. FIG. 11 is a conceptual diagram for describing an example of a guide image according to the seventh embodiment of the present invention.

As shown in FIG. 11, when a character string "network" is input, "system" is automatically displayed to follow. "system" is, for example, a recently used character string as the character string that follows the character string "network". Terminal control unit 11 stores therein history information as to what word has been used to follow the character string "network". Terminal control unit 11 receives the character string "network" and confirms it. Then, subsequently, terminal control unit 11 retrieves history information to find out the character string "system" that is recently used to follow the character string "network", and displays "system" in input character string area 91 indicated by the double frame. "system" becomes a character candidate being a candidate of the input confirmed character. Terminal control unit 11 varies the background color of the character string "system" displayed in input character string area 91, 92, 93, and 94 in accordance with remaining time Tz until an input confirmation. It is to be noted that, the seventh embodiment can be realized by the process procedures which are similar to the flowcharts referred to in connection with the first to sixth embodiments, whose description has already been made.

It is to be noted that, it is also possible not to confirm the character string "network" upon reception thereof, and to display, on the right side of "network", a character string being the follower candidate that may possibly follow, such that the character string "network" and the character string follower candidate can be confirmed in batch processing. Further, when the follower candidate is not the desired character string, it may be replaced by another follower candidate by a manipulation of a specific key or the like, and that replacement may be displayed on the right side of "network". It is to be noted that, this manipulation must be completed before remaining time Tz until an input confirmation for the immediately preceding follower candidate reaches zero.

As has been described above, terminal control unit 11 of a character input device according to the seventh embodiment may determine a character candidate, and thereafter may display, based on history information, a character candidate which is to be selected to follow the character candidate and to be subjected to input confirmation.

It is to be noted that, the guide image is not limited to those whose background color varies, and various guide images having been described in connection with the first or fifth embodiment may be employed. Further, instead of the guide image, a guide sound whose description has been made in connection with the first embodiment may be employed.

In the foregoing, the character input device and the character input method according to the embodiments of the present invention has been described in connection with the first to seventh embodiments. Here, it is to be noted that the character as used in the embodiments of the present invention includes a single character, a character string, a pictogram, and a symbol.

Further, the components of the character input device according to the first to seventh embodiments of the present invention can be implemented as hardware by electronic circuitry, or may be realized as an MPU which executes in memory software stored in a ROM that realizes the function of each of the components. It is to be noted that rewritable nonvolatile storage is suitable as ROM and the present invention can be realized with volatile storage as well.

It is to be noted that, the embodiments of the present invention is not limited to the first to seventh embodiments, and various modification can be made as to the structure of the device and the procedures of the flowcharts within the scope of the present invention.

INDUSTRIAL APPLICABILITY

A character input device and a character input method according to the present invention are less likely to cause a person unaccustomed to key input manipulation to make an input error. Therefore, it is useful not only in a remote controller of a television set, a mobile phone and the like, but is useful as a character input device and a character input method for a variety of equipment.

REFERENCE MARKS IN THE DRAWINGS 1 terminal
2 remote controller (manipulating unit)
3 mobile terminal
10 receiver unit
11 terminal control unit
12 timer
13 guide generation processing unit
14 display unit
15, 20 key manipulating unit
21 transmitter unit
61, 62, 87, 88, 89 guide image
81, 82, 83, 84, 91, 92, 93, 94 input character string area
85 pull-down menu area
Tz remaining time

The invention claimed is:

1. A character input device comprising:
a display including a screen;
an input portion comprising at least one key to which a plurality of characters is assigned; and
a terminal controller configured to:
  receive a user key operation, with respect to one candidate character to be input, of the first key of the input portion;
  display, on the screen, the one candidate character being input corresponding to the user key operation of the fist key and a guide image corresponding to the one candidate character being input, the guide image being different from the one candidate character, wherein:
the guide image visually varies a plurality of times during a predetermined time period after the one candidate character being input is displayed, and
the guide images visually varies in such a manner that at least one of a brightness, a color, a size and a shape of the guide image gradually changes reflecting a remaining time until a lapse of the predetermined time period.

2. The character input device according to claim 1, wherein the guide images visually varies at least three times in accordance with a remaining time until a lapse of the predetermined time period.

3. The character input device according to claim 1, wherein the guide images becomes visually static or disappears at an end of the predetermined time period.

4. The character input device according to claim 1, wherein the guide image moves to a second area for receiving an additional key input after the predetermined time period lapsed.

5. A character input device comprising:
   a display including a screen;
   an input portion comprising at least one first key to which a plurality of characters is assigned;
   a terminal controller configured to:
     receive a user key operation, with respect to one candidate character to be input, of the first key of the input portion; and
     display, in an input character string area on the screen, the one candidate character being input corresponding to the user key operation of the first key and a guide image corresponding to the one candidate character being input, the guide image being different from the one candidate character, wherein:
   the guide image overlaps an area where the one candidate character is displayed,
   the guide images visually varies a plurality of times during a predetermined time period after the one candidate character being input is displayed, and
   the guide images visually varies in such a manner that at least one of a brightness, a color, a size and a shape of the guide image gradually changes reflecting a remaining time until a lapse of the predetermined time period.

6. The character input device according to claim 5, wherein the guide images visually varies at least three times in accordance with a remaining time until a lapse of the predetermined time period.

7. The character input device according to claim 5, wherein the guide images becomes visually static or disappears at an end of the predetermined time period.

8. The character input device according to claim 5, wherein the guide image moves to a second area for receiving an additional key input after the predetermined time period lapsed.

9. A character input device comprising:
   a display including a screen;
   an input portion comprising at least one first key to which a plurality of characters is assigned;
   a terminal controller configured to:
     receive a user key operation, with respect to one candidate character to be input, of the first key of the input portion; and
     display, on the screen, the one candidate character being input corresponding to the user key operation of the first key in a first area and a guide image corresponding to the one candidate character being input in a second area that differs with the first area, the guide image being different from the one candidate character, wherein;
   the guide images visually varies a plurality of times during a predetermined time period after the one candidate character being input is displayed, and
   the guide images visually varies in such a manner that at least one of a brightness, a color, a size and a shape of the guide image gradually changes reflecting a remaining time until a lapse of the predetermined time period.

10. The character input device according to claim 9, wherein the guide images visually varies at least three times in accordance with a remaining time until a lapse of the predetermined time period.

11. The character input device according to claim 9, wherein the guide images becomes visually static or disappears at an end of the predetermined time period.

12. The character input device according to claim 9, wherein the guide image moves to a second area for receiving an additional key input after the predetermined time period lapsed.

\* \* \* \* \*